United States Patent
Griggs et al.

(10) Patent No.: US 7,234,287 B2
(45) Date of Patent: *Jun. 26, 2007

(54) NETTING CHUTES WITH RIBBED FLOORING FOR MANUAL AND/OR AUTOMATED CLIPPING PACKAGING APPARATUS

(75) Inventors: Samuel D. Griggs, Raleigh, NC (US); Dennis J. May, Pittsboro, NC (US)

(73) Assignee: Tipper Tie, Inc., Apex, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 10/969,717

(22) Filed: Oct. 20, 2004

(65) Prior Publication Data

US 2005/0060957 A1 Mar. 24, 2005

Related U.S. Application Data (63) Continuation-in-part of application No. 10/782,552, filed on Feb. 19, 2004, now Pat. No. 6,945,010, which is a continuation of application No. 10/738,315, filed on Dec. 17, 2003, now abandoned, and a continuation-in-part of application No. 10/725,109, filed on Dec. 1, 2003, now Pat. No. 6,976,346, which is a continuation of application No. 10/339,910, filed on Jan. 10, 2003, now Pat. No. 6,729,102.

(60) Provisional application No. 60/508,609, filed on Oct. 3, 2003, provisional application No. 60/478,077, filed on Jun. 12, 2003, provisional application No. 60/347,477, filed on Jan. 11, 2002.

(51) Int. Cl.
*B65B 9/15* (2006.01)
*B65B 51/05* (2006.01)

(52) U.S. Cl. .......................... 53/417; 53/459; 53/469; 53/138.4

(58) Field of Classification Search ................... 53/439, 53/134.1, 138.4, 530, 567, 576, 577, 417, 53/459

See application file for complete search history.

(56) References Cited

U.S. PATENT DOCUMENTS

| | | | |
|---|---|---|---|
| 2,720,055 | A | 10/1955 | Milo |
| 2,880,419 | A | 4/1959 | Tipper |
| 3,342,017 | A | 9/1967 | Yerkey |
| 3,358,418 | A | 12/1967 | Manetta |

(Continued)

FOREIGN PATENT DOCUMENTS

DE 2452760 5/1976

(Continued)

OTHER PUBLICATIONS

Product Brochure, 6 sheets, "Tipper Net For Smoking, Hanging & Decoration, Net-All® Netting Is The Answer," ©2000.

(Continued)

*Primary Examiner*—John Sipos
(74) *Attorney, Agent, or Firm*—Myers Bigel Sibley & Sajovec PA (57) ABSTRACT

Netting chutes suitable for use with manual and automatic packaging operations to enclose product in netting packaging include at least one axially extending rib.

3 Claims, 9 Drawing Sheets

U.S. PATENT DOCUMENTS

| | | | |
|---|---|---|---|
| 3,383,754 A | 5/1968 | Klenz | |
| 3,389,533 A | 6/1968 | Tipper et al. | |
| 3,400,433 A | 9/1968 | Klenz | |
| 3,499,259 A | 3/1970 | Tipper et al. | |
| 3,543,378 A | 12/1970 | Klenz | |
| 3,587,204 A | 6/1971 | George | 53/138.4 |
| 3,662,514 A | 5/1972 | Goss | 53/567 |
| 3,719,022 A | 3/1973 | Cherio | |
| 3,732,662 A | 5/1973 | Paxton | 53/415 |
| 3,797,199 A | 3/1974 | Seifert | |
| 3,815,323 A * | 6/1974 | Longo | 53/530 |
| 3,945,171 A | 3/1976 | arietta et al. | 53/576 |
| D243,158 S | 1/1977 | Bolwell | D15/145 |
| 4,044,450 A | 8/1977 | Raudys et al. | |
| 4,091,595 A | 5/1978 | Peister et al. | 53/417 |
| 4,165,593 A | 8/1979 | Niedecker | |
| 4,247,005 A | 1/1981 | Buxton | 53/138.4 |
| 4,430,772 A | 2/1984 | Michel et al. | |
| 4,505,003 A | 3/1985 | Becker et al. | 53/576 |
| 4,525,898 A | 7/1985 | Gallion et al. | 24/30.5 W |
| 4,537,006 A | 8/1985 | Pieri | 53/134 |
| 4,590,748 A | 5/1986 | Harrison et al. | 53/576 |
| 4,651,498 A | 3/1987 | Piereder | 53/122 |
| 4,675,945 A | 6/1987 | Evans et al. | 452/48 |
| 4,683,700 A | 8/1987 | Evans et al. | 53/138.4 |
| 4,766,713 A | 8/1988 | Evans | 53/138.2 |
| 4,847,953 A | 7/1989 | Evans et al. | 452/36 |
| 4,944,172 A | 7/1990 | Evans | 72/53 |
| 4,969,233 A | 11/1990 | Stanley | |
| 5,016,424 A | 5/1991 | Stirling | 53/459 |
| 5,017,175 A | 5/1991 | Klusmire | |
| 5,024,041 A | 6/1991 | Urban et al. | 53/449 |
| 5,042,234 A | 8/1991 | Evans et al. | 53/523 |
| 5,044,144 A | 9/1991 | Foote et al. | 29/803 |
| 5,067,313 A | 11/1991 | Evans | 53/576 |
| 5,074,386 A | 12/1991 | Evans | 188/67 |
| 5,085,036 A | 2/1992 | Evans et al. | 53/550 |
| 5,107,666 A | 4/1992 | Rahtican | |
| 5,109,648 A | 5/1992 | Evans | |
| 5,135,770 A | 8/1992 | Underwood | 426/271 |
| 5,161,347 A | 11/1992 | May et al. | 53/138.2 |
| 5,165,216 A | 11/1992 | May et al. | |
| 5,167,567 A | 12/1992 | Evans | 452/37 |
| 5,181,302 A | 1/1993 | Evans | 29/243.56 |
| 5,203,760 A | 4/1993 | Chen et al. | 493/302 |
| D340,467 S | 10/1993 | Pollak et al. | D15/150 |
| 5,402,625 A | 4/1995 | Halstead | 53/570 |
| 5,421,142 A | 6/1995 | Cullen | |
| 5,426,910 A * | 6/1995 | Cullen | 53/128.1 |
| 5,476,673 A | 12/1995 | Sombrio | |
| 5,495,701 A | 3/1996 | Poteat et al. | 53/138.2 |
| 5,570,561 A | 11/1996 | May et al. | 53/138.4 |
| 5,586,424 A | 12/1996 | Chen et al. | 53/138.2 |
| 5,715,656 A | 2/1998 | Pearce | |
| 5,884,346 A | 3/1999 | Hengl | |
| 6,052,972 A | 4/2000 | Rea et al. | 53/576 |
| 6,131,367 A | 10/2000 | Fukuda et al. | |
| 6,401,885 B1 | 6/2002 | Whittlesey | 188/322.16 |
| 6,604,338 B1 | 8/2003 | May et al. | 53/138.2 |
| 6,637,075 B1 | 10/2003 | Gorman et al. | 24/30.5 W |
| 6,694,711 B1 | 2/2004 | Cullen | 53/567 |
| 6,695,364 B2 | 2/2004 | Bierlin | 292/307 |
| 6,708,742 B2 | 3/2004 | Weathers et al. | |
| 6,719,194 B2 | 4/2004 | Richards | |
| 6,729,102 B2 * | 5/2004 | Ailey et al. | 53/134.1 |
| 6,745,547 B2 | 6/2004 | Bussey et al. | 53/576 |
| 6,883,297 B2 | 4/2005 | Kirk et al. | 53/502 |
| 6,945,171 B1 | 9/2005 | Coull | |
| 6,976,346 B2 | 12/2005 | May et al. | |
| 2003/0131564 A1 | 7/2003 | Ailey et al. | 53/413 |
| 2005/0034426 A1 | 2/2005 | Griggs et al. | 53/417 |
| 2005/0039419 A1 | 2/2005 | Griggs et al. | 53/417 |
| 2005/0101240 A1 | 5/2005 | Mysker | |
| 2005/0229541 A1 | 10/2005 | Griggs | |
| 2005/0235608 A1 | 10/2005 | Griggs | |
| 2005/0247026 A1 | 11/2005 | Griggs | |
| 2005/0274088 A1 | 12/2005 | Griggs | |
| 2005/0284108 A1 | 12/2005 | Griggs | |

FOREIGN PATENT DOCUMENTS

| | | |
|---|---|---|
| EP | 0 301 768 | 2/1989 |
| GB | 1491444 | 11/1977 |
| GB | 1564397 | 4/1980 |
| JP | 2002-019735 | 1/2002 |
| WO | WO 2000/020282 | 4/2000 |
| WO | WO 2004/007298 | 1/2004 |
| WO | 2004/0250512 | 12/2004 |
| WO | 2005/0053699 | 3/2005 |
| WO | 2005/0072119 | 4/2005 |
| WO | 2005/0087075 | 4/2005 |
| WO | WO 2005/044020 | 5/2005 |
| WO | 11/256809 | 10/2005 |
| WO | 11/262600 | 10/2005 |

OTHER PUBLICATIONS

Product Brochure, 1 sheet, "Tipper Clipper®-Signature Series SZ3214 Double Clipper for Netting," © 2002.

Product Brochure, 2 sheets, "Tipper Net Z3200 Double Clipper and Plant Netting System," © 2000.

Product Brochure, 1 sheet, "Tipper Tie-Net, Safely and quickly package plugs before shipping," © 1999.

Product Brochure, 1 sheet, "Tipper Netter TN-3000 Automatic Netting-Packaging Machine," © 2002.

Product Brochure, 4 sheets, "Net-All® Netting Is The answer To All Your Horticultural Applications,"© 2001.

Product Brochure, 2 sheets, "Net-All Sleeved Plastic Netting System," © 2000.

U.S. Appl. No. 60/579,709, Poteat et al.

Brochure *TCM 2250 Pumpable for muscle pieces*, 2 sheets, 1994 ©.

International Search Report and Invitation to Pay Additional Fees for PCT application No. PCT/US2005/020019 dated Oct. 28, 2005.

International Search Report and Written Opinion of the International Searching Authority for PCT application PCT/US2005/020006 dated Oct. 25, 2005.

International Search Report and Written Opinion of the International Searching Authority for International Patent Application No. PCT/US2005/017252 mailed on Sep. 7, 2005.

Rigidized Metals Corporation, Corporate Profile, 1 page, <http://www.rigidized.com> accessed on Sep. 23, 2005, but for the purposes of examination, the reference is deemed to be before the priority filing date of the instant application.

www.mcmaster.com, Compressed Air Flow Control Valves, 1 sheet, Date unknown but believed to be before Oct. 2004.

www.tippertie.com/smoked/tcm2250.asp, 2 sheets, date believed to be before Nov. 1, 2004.

International Search Report and Written Opinion of the International Searching Authority for PCT application No. PCT/US2005/020019 dated Jan. 16, 2006.

* cited by examiner

NETTING CHUTES WITH RIBBED FLOORING FOR MANUAL AND/OR AUTOMATED CLIPPING PACKAGING APPARATUS

RELATED APPLICATIONS

This application is a continuation of U.S. patent application Ser. No. 10/738,315 filed Dec. 17, 2003 now abandoned, which claims the benefit of priority of U.S. Provisional Patent Application Ser. No. 60/508,609, filed Oct. 3, 2003; this application is also a continuation-in-part of U.S. patent application Ser. No. 10/725,109 filed Dec. 1, 2003 now U.S. Pat. No. 6,976,346, which claims the benefit of priority to U.S. Provisional Patent Application Ser. No. 60/478,077, filed Jun. 12, 2003, and this application is also a continuation-in-part of U.S. patent application Ser. No. 10/782,552, filed Feb. 19, 2004, now U.S. Pat. No. 6,945,010 which is a continuation of U.S. patent application Ser. No. 10/339,910, now issued U.S. Pat. No. 6,729,102, which claims the benefit of priority to U.S. Provisional Patent Application Ser. No. 60/347,477, filed Jan. 11, 2002. The contents of the above applications are hereby incorporated by reference as if recited in full herein.

FIELD OF THE INVENTION

The present invention relates to apparatus that can enclose products in packaging materials, and may be particularly suitable for enclosing products in clippable netting material.

BACKGROUND OF THE INVENTION

Certain types of commodity and/or industrial items can be packaged by placing the desired product(s) in a covering material and then applying a closure clip or clips to end portions of the covering material to secure the product(s) therein. For non-flowable piece goods, the piece goods can be held individually in a respective clipped package, or as a group of goods in a single package. The covering material can be any suitable material, typically a casing and/or netting material.

Generally described, when packaging a piece good product in netting, the product is pushed through a netting chute. The product can include, by way of example, a non-flowable semi-solid and/or solid object such as a meat product including whole or half hams, turkeys, chickens, and the like. The netting chute holds a length of a netting sleeve over the exterior thereof. A first downstream end portion of the netting is typically closed using a first clip. As the product exits the netting chute, it is covered with the netting. The netting can be held relatively tight (typically stretched or in tension) over the product. The open end of the netting (upstream of the product) is then gathered and another clip can be applied to the gathered netting, typically using a double clipper apparatus. A clip attachment apparatus or "clippers" are well known to those of skill in the art and include those available from Tipper Tie, Inc., of Apex, N.C., under product numbers Z3214, Z3202, and Z3200. Examples of clip attachment apparatus and/or packaging apparatus are described in U.S. Pat. Nos. 3,389,533; 3,499,259; 4,683,700; and 5,161,347, the contents of which are hereby incorporated by reference as if recited in full herein.

The double clipper apparatus concurrently applies two clips to the netting proximate the open (upstream) end of the package. One clip defines the leading end portion of the package and the other defines the trailing or second end portion of the package then being closed. A cutting mechanism incorporated in the clipper apparatus can sever the two packages before the enclosed package is removed from the clipper apparatus. U.S. Pat. No. 4,766,713 describes a double clipper apparatus used to apply two clips to a casing covering. U.S. Pat. No. 5,495,701 proposes a clipper with a clip attachment mechanism configured to selectively fasten a single clip or two clips simultaneously.

SUMMARY OF EMBODIMENTS OF THE INVENTION

Embodiments of the present invention provide netting product chutes that can be used to automatically and/or manually package a product in a covering material and/or applying clips thereto.

Certain embodiments are directed toward netting/product chutes having an interior cavity and an exterior surface adapted to hold netting in tension thereon. The chute can have a floor with at least one axially extending rib. The chute may have a non-circular cross-sectional profile.

In certain embodiments, the product can be manipulated and packaged so that at least one clip is automatically applied to enclose the product in the covering material. Particular embodiments automatically package a discrete object or objects in netting.

Certain embodiments are directed toward netting/product chutes comprising an outer wall and a floor that define an interior cavity with a longitudinal axis, an exterior surface of the outer wall adapted to hold netting thereon, the floor having at least one axially extending rib.

Certain embodiments are directed toward systems for enclosing a semi-solid or solid product in a covering material. The systems include: (a) an elongate product chute having a floor with at least one axially extending rib, an outer wall, and opposing receiving and discharge end portions with an interior cavity defined by the floor and outer wall extending therethrough; and (b) a clipper mechanism disposed downstream of the discharge end of the product chute, the clipper mechanism configured to apply at least one clip to a covering material that encloses the product from the product chute.

Other embodiments are directed to methods of packaging an object or objects in netting. The methods include: (a) pushing at least one object through a product chute having a floor with at least one rib thereon; (b) pulling netting material downstream of the product chute from an outer surface of the product chute to automatically enclose the object in netting material as the object exits the product chute; and then (c) applying at least one clip to the netting material to secure the object in the netting material.

In particular embodiments, at least one rib is transversely offset from a centerline of the product chute cavity. The chute can include an entry portion that has a larger cross-sectional area than an intermediate portion.

In some embodiments, the chute includes two axially extending spaced-apart ribs that are securely affixed to the floor and define sidewalls of a channel that extends therebetween.

The chute may comprise an entry portion that has a flared segment with a cross-sectional area that tapers into an adjacent downstream portion with a smaller cross-sectional area. The chute floor and/or channel floor may be substantially planar.

In yet other embodiments, the at least one rib is a single axially extending rib that can be transversely offset from an axially extending centerline.

The chute can include a mounting bracket attached thereto. The mounting bracket may have a planar substantially horizontal mounting platform and a vertical segment with a support channel configured to receive and hold a bottom portion of the product chute. The mounting bracket may be configured as a "quick disconnect" component to allow a changeover to a different product chute held on a similarly configured mounting bracket.

These and other objects and/or aspects of the present invention are explained in detail in the specification set forth below.

DESCRIPTION OF EMBODIMENTS OF THE INVENTION

The present invention will now be described more fully hereinafter with reference to the accompanying figures, in which embodiments of the invention are shown. This invention may, however, be embodied in many different forms and should not be construed as limited to the embodiments set forth herein. Like numbers refer to like elements throughout. In the figures, certain layers, components or features may be exaggerated for clarity, and broken lines illustrate optional features or operations, unless specified otherwise. In addition, the sequence of operations (or steps) is not limited to the order presented in the claims unless specifically indicated otherwise. Where used, the terms "attached", "connected", "contacting", "coupling" and the like, can mean either directly or indirectly, unless stated otherwise. The term "concurrently" means that the operations are carried out substantially simultaneously.

In the description of the present invention that follows, certain terms are employed to refer to the positional relationship of certain structures relative to other structures. As used herein, the term "front" or "forward" and derivatives thereof refer to the general or primary direction that the product travels for packaging and closure; this term is intended to be synonymous with the term "downstream," which is often used in manufacturing or material flow environments to indicate that certain material traveling or being acted upon is farther along in that process than other material. Conversely, the terms "rearward" and "upstream" and derivatives thereof refer to the directions opposite, respectively, the forward and downstream directions.

Embodiments of the present invention are particularly suitable for applying closure clips to discrete objects held in a covering material. The covering material may be natural or synthetic and may be a casing material that can be sealed about a product or may be netting. The casing can be any suitable casing (edible or inedible, natural or synthetic) such as, but not limited to, collagen, cellulose, plastic, elastomeric or polymeric casing. The term "netting" refers to any open mesh material in any form including, for example, knotted, braided, extruded, stamped, knitted, woven or otherwise. Typically, the netting is configured so as to be stretchable in both axial and lateral directions (i.e., elastic, and typically isotropically elastic).

Netting or other covering material may be used to package discrete meat products such as loaves of meat, boned ham, spiral-sliced ham, deboned ham, turkey, turkey loaves held in molds, or other meat; the packaging may be formed on the item alone or with the items held in subcontainers and/or wraps such as molds, trays, boxes, bags, absorbent or protective sheets, sealant, cans and the like. Other embodiments of the present invention may be directed to package other types of food such as cheese, bread, fruit, vegetables, and the like. Examples of non-food items that may be packaged using embodiments of the present invention include living items such as flora, trees, and the like, as well as inanimate objects. Additional examples of products include discrete, semi-solid or solid non-flowable objects such as firewood, pet food (typically held in a container if the wet type), recreational objects (such as balls), or other solid or semi-solid objects. The product may be for any suitable industry including horticulture, aquaculture, agriculture, or other food industry, environmental, chemical, explosive, or other application. Netting may be particularly useful to package ham or turkeys, manufactured hardware such as automotive parts, firewood, explosives, molded products, and other industrial, consumable, and/or commodity item(s).

Generally stated, embodiments of the present invention are directed to the packaging of piece goods or discrete items by forcing them through a product chute, wrapping or enveloping the objects at the other end of the chute in a covering material, such as netting, then clipping the covering material with a closure clip or other attachment means to close the covering and hold the object or objects inside of the covering material. As noted above, clippers are available from Tipper Tie, Inc., of Apex, N.C. Examples of suitable clips include metallic generally "U"-shaped clips also available from Tipper Tie, Inc., in Apex, N.C. Other clips, clip materials and clip configurations or closure means may also be used.

Figure 1:
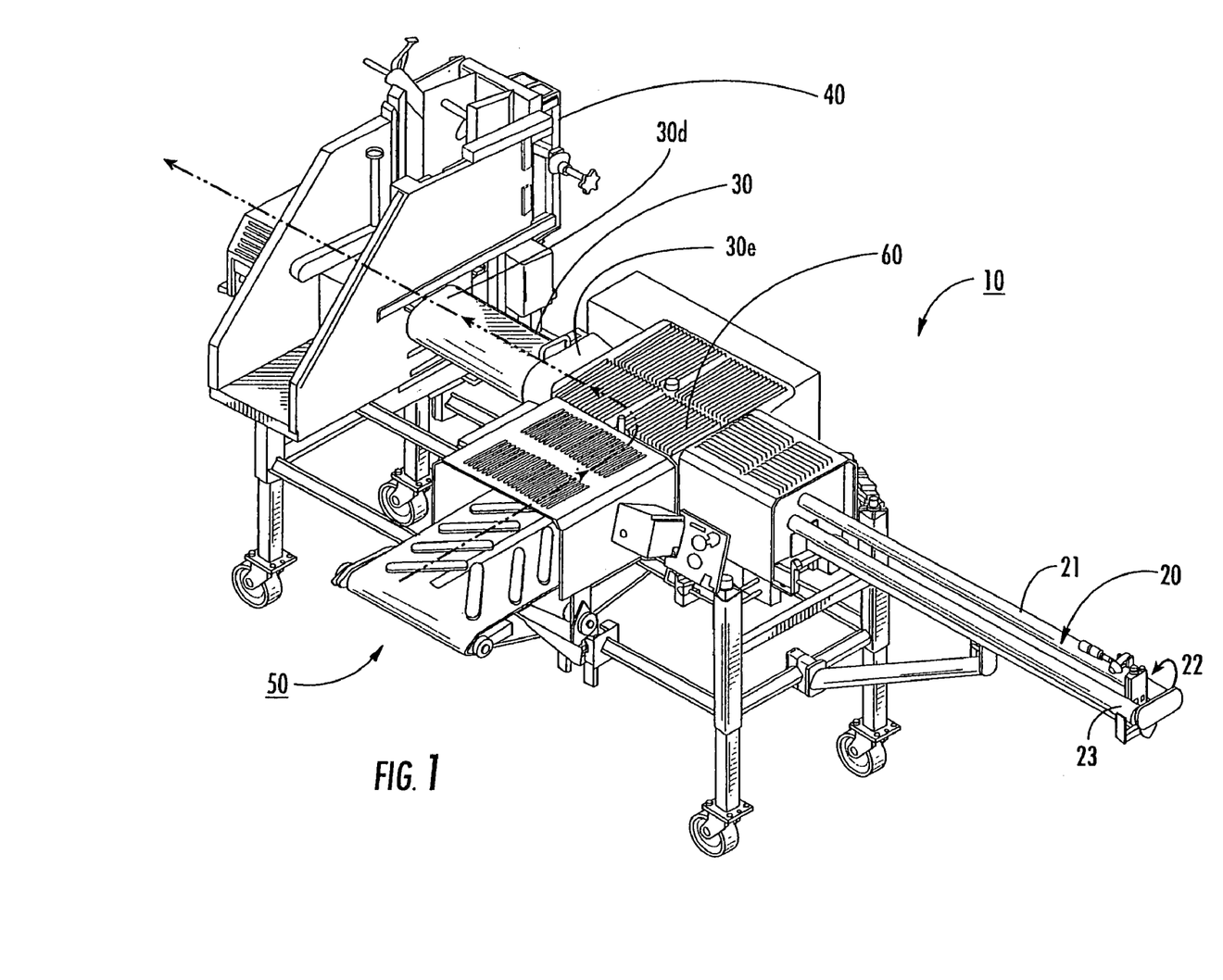
FIG. 1 is a front perspective view of an apparatus/system used to automatically advance objects through a product chute and then automatically apply a clip(s) via a clipper mechanism according to embodiments of the present invention.

FIG. 1 illustrates an exemplary automatic clipping packaging apparatus 10 according to embodiments of the present invention. As shown, the apparatus 10 includes a product pusher assembly or mechanism 20, a product chute 30, and a clipper 40. It is noted that the clipper 40 may be referred to herein as a clipper apparatus, clipper mechanism, and/or clipper assembly, but each term may be used interchangeably with the others. As shown, the apparatus 10 may optionally include an infeed conveyor 50. In the embodiment shown, the apparatus 10 can be described as a horizontal automatic clipping packaging apparatus as the product is primarily moved, processed, clipped and packaged in a horizontal plane. However, certain components, features or operations may be oriented and/or carried out in other planes or directions and the present invention is not limited thereto. For example, the product chute 30 may be tilted from horizontal, typically so that the discharge or egress end 30*d* is closer the ground than the product entry or ingress end 30*e*. The direction of travel of an exemplary product undergoing packaging is illustrated by the broken line arrows in FIG. 1.

This positioning of the product in the flow path and/or alignment with the product chute cavity 30*c* (FIGS. 3, 4 and 9) can be carried out substantially automatically as will be discussed further below. However, a target product undergoing packaging can also be manually introduced or placed into the flow path and subsequently processed as in an automatic in-feed operation.

Figure 2A:
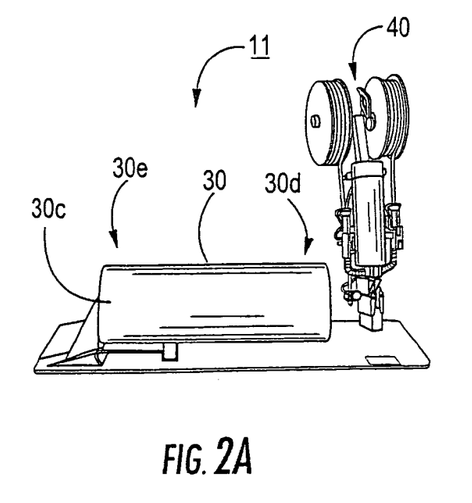
FIGS. 2A–2D are front views of a manual packaging system illustrating a sequence of operations that can employ the netting chutes of the present invention according to embodiments of the present invention.
Figure 2B:
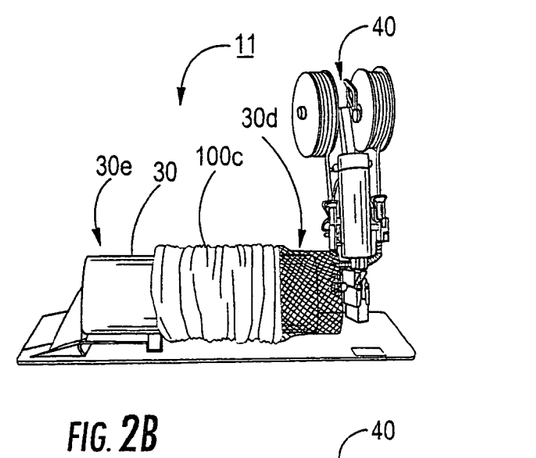
Figure 2C:
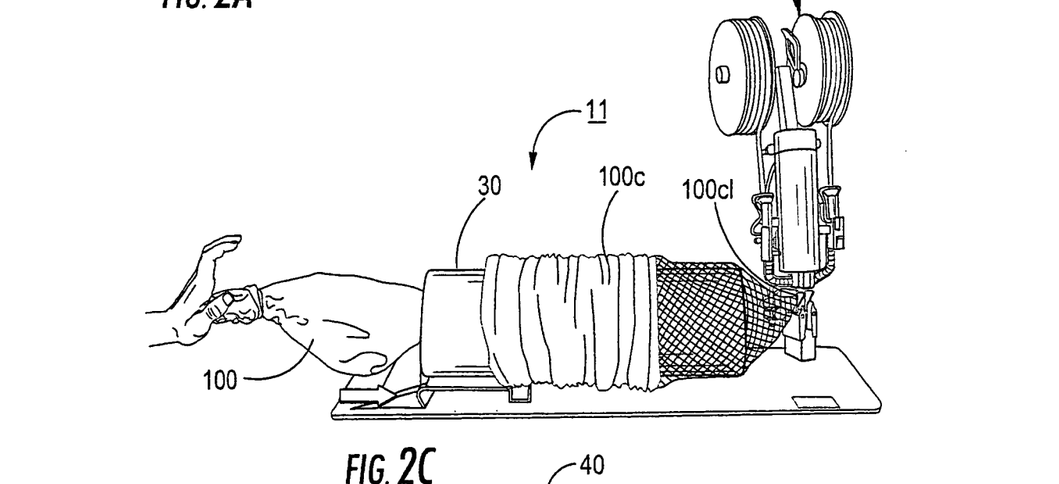

In operation, the product pusher assembly 20 linearly retracts and advances to push a product through the product chute 30 so that the product is positioned proximate the clipper 40 and then retracts to a resting state upstream of the product transfer zone 60. As described above, a sleeve of covering material 100*c* (see FIG. 2B) can be positioned about the external surface of the product chute 30 and configured to be drawn downstream thereof so as to automatically encase the product as the product emerges from the discharge end 30*d* of the product chute 30. A supplemental sleeve material holder may also be used if desired instead of placing the sleeve of casing material on the product chute. The supplemental sleeve holder can be configured to surround a downstream portion of the product chute (not shown). The sleeve of covering material may be sized to stretch to substantially conform to the external wall or surface of the product chute 30 or may be more loosely held thereon. The cavity of the product chute 30*c* (FIGS. 3, 4 and 9) may be sized to snugly contact or squeeze opposing portions of the product (side to side and/or top to bottom) as the product is pushed therethrough or may be oversized with respect to the product so that the product loosely travels therethrough.

In some embodiments, the shape, size and/or type of product can determine a suitable netting diameter to provide a desired tightness of netting and, hence, influence the product chute design factor.

In operation, the sleeve of covering material may be clipped, welded, fused, knotted or otherwise closed at a leading edge portion thereof. When the product exits the product chute 30, it is held in the covering material as the covering material is drawn downstream. The covering material is typically loaded onto the product chute 30 and the leading edge portion closed before the product chute 30 is mounted to the apparatus 10. Additional description of a suitable automatic apparatus is described in co-pending, co-assigned U.S. Provisional Patent Ser. No. 60/508,609, filed Oct. 3, 2003, the contents of which were incorporated by reference above.

Figure 2D:
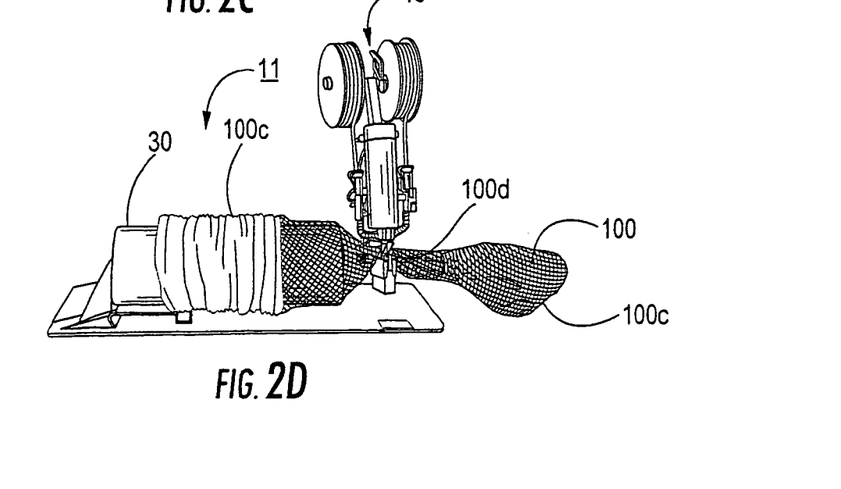

FIGS. 2A–2D illustrate a manual or semi-manual system 11 with a series of operations that can be used to package a target product 100 or products using a product chute 30 and a desired covering material 100*c*. FIG. 2D illustrates a clipped 100*cl* package of netting enclosing the product 100.

Figure 3:
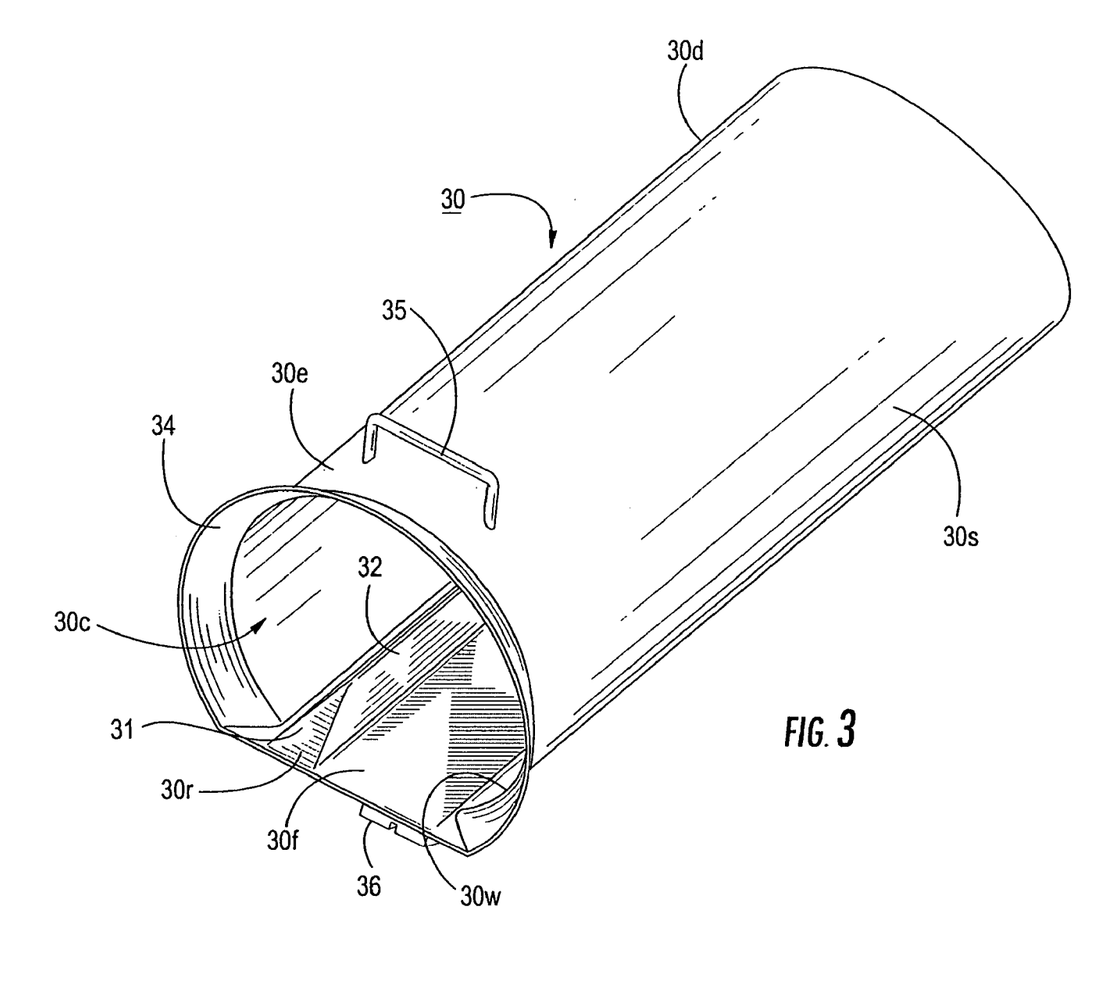
FIG. 3 is a front perspective view of a product chute according to embodiments of the present invention.

FIG. 3 illustrates one embodiment of a product chute 30 that can be used with automatic and/or manual packaging systems. As shown, the product chute 30 includes an outer surface 30*s*, a cavity 30*c*, and a floor 30*f*. In this embodiment, the product chute floor 30*f* includes at least one (shown as a single) axially extending rib 30*r* that has a height such that it extends vertically above the adjacent portions of the floor 30*f*. The term "rib" means a projecting generally axially extending member that is sized and configured so that it can influence the movement and/or positioning of a product 100 as the product enters and/or travels through the chute 30.

As shown, the floor 30*f* can be substantially planar and disposed at the lower portion of a curvilinear wall 30*w*. In certain embodiments, the chute is configured so that the curvilinear wall 30*w* terminates or merges into the floor 30*f* to together define a non-circular cross-sectional shape of the cavity 30*c*.

Thus, in certain embodiments, the product chute 30 has a cross-sectional profile that is non-circular. As shown in FIG. 3, the product chute 30 may be configured with a planar bottom portion and generally semi-circular side portions. Other cross-sectional profile configurations may also be used including, but not limited to, circular, oval, triangular, rectangular, square and the like.

The product chute body may include a single continuous wall that defines the shape of the cavity 30*c* above the floor 30*f*. In other embodiments, the product chute body can be formed with a plurality of walls. In some embodiments, the product chute 30 is fabricated from stainless steel. The interior surface or portions thereof may be coated with an anti-stick coating and/or lubricant. For example, the interior of the chute 30 may comprise TEFLON® polymer. In particular embodiments, a single sheet of sheet metal can be formed to provide the desired product chute body shape.

As shown, the rib 30*r* is disposed such that is offset from the center of the cavity 30*c*, although in some embodiments the rib 30*r* may be centered on the floor 30*f*. The rib 30*r* can be positioned adjacent a lower portion of the curvilinear wall 30*w*. Typically, the rib 30*r* includes a ramped forward edge portion 30*r* that inclines or rises to a peak 32. The ramped forward edge portion 30*r* may have a planar surface segment 31 that tapers in width as the ramped portion rises. The segment 31 can have a width that is wider adjacent the floor 30*f* than the width closer to the peak 32.

As is also shown, the product chute 30 may include an outwardly flaring edge portion 34 that gradually tapers into the primary chute body. Thus, the product chute 30 can include a larger front-end cavity area relative to the intermediate and/or discharging portion 30*d*, i.e., the chute cavity 30*c* narrows in the pushing/product travel direction. Thus, the product chute 30 can include a primary body and a larger upstream guide portion that narrows into the shape of the primary body. The chute 30 may be formed as a unitary member or a series of attached members (not shown).

In operation, a supply of covering material 100*c* can be placed on or about the chute 30 and arranged to surround the exterior surface of at least a portion of the product chute 30. The covering material 100*c* stretches in tension in the downstream direction to cover the product (tenting in the axial direction) as the product exits the discharge end portion of the product chute 30*d*. In certain embodiments, the covering material is configured and sized to stretch in at least the lateral direction and typically in both the lateral and axial directions as it is held on and dispensed from the product chute 30.

The product chute 30 can include a handle 35 or other suitable gripping means thereon to facilitate operator handling. In addition, the product chute 30 may include a mounting bracket 36 that allows the chute 30 to be secured to a mounting frame during operation. Although the product chute 30 is shown as having a continuous outer surface or wall, other configurations may also be used. For example, the chute wall or walls may include a slot or apertures and may not be a closed configuration, typically depending on the application. However, the chute 30 should be configured to provide sufficient structural support for the covering material (typically sized and configured to hold the covering stretched in both lateral and longitudinal directions) and to allow the product to enter the product material as it exits the product chute 30.

Figure 4:
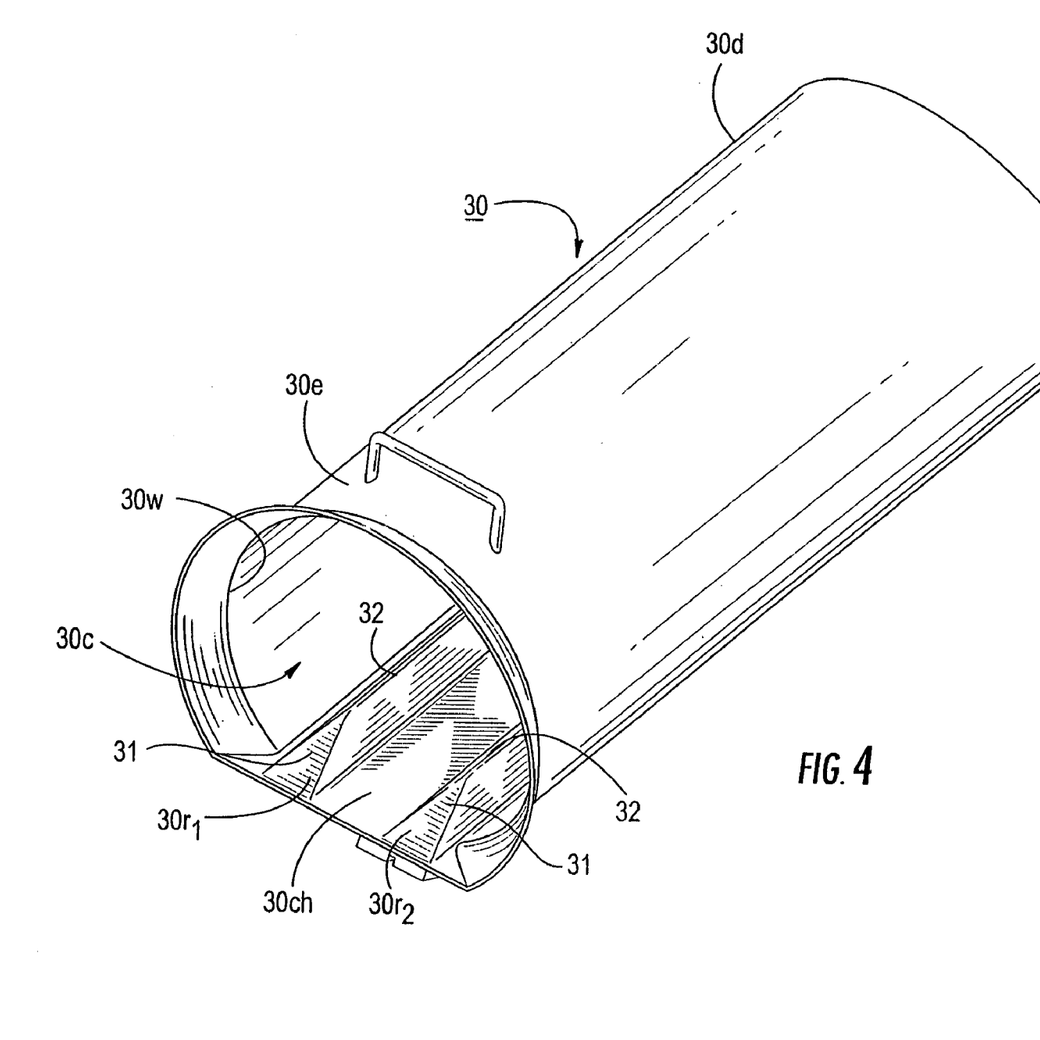
FIG. 4 is a front perspective view of a product chute according to other embodiments of the present invention.
Figure 5:
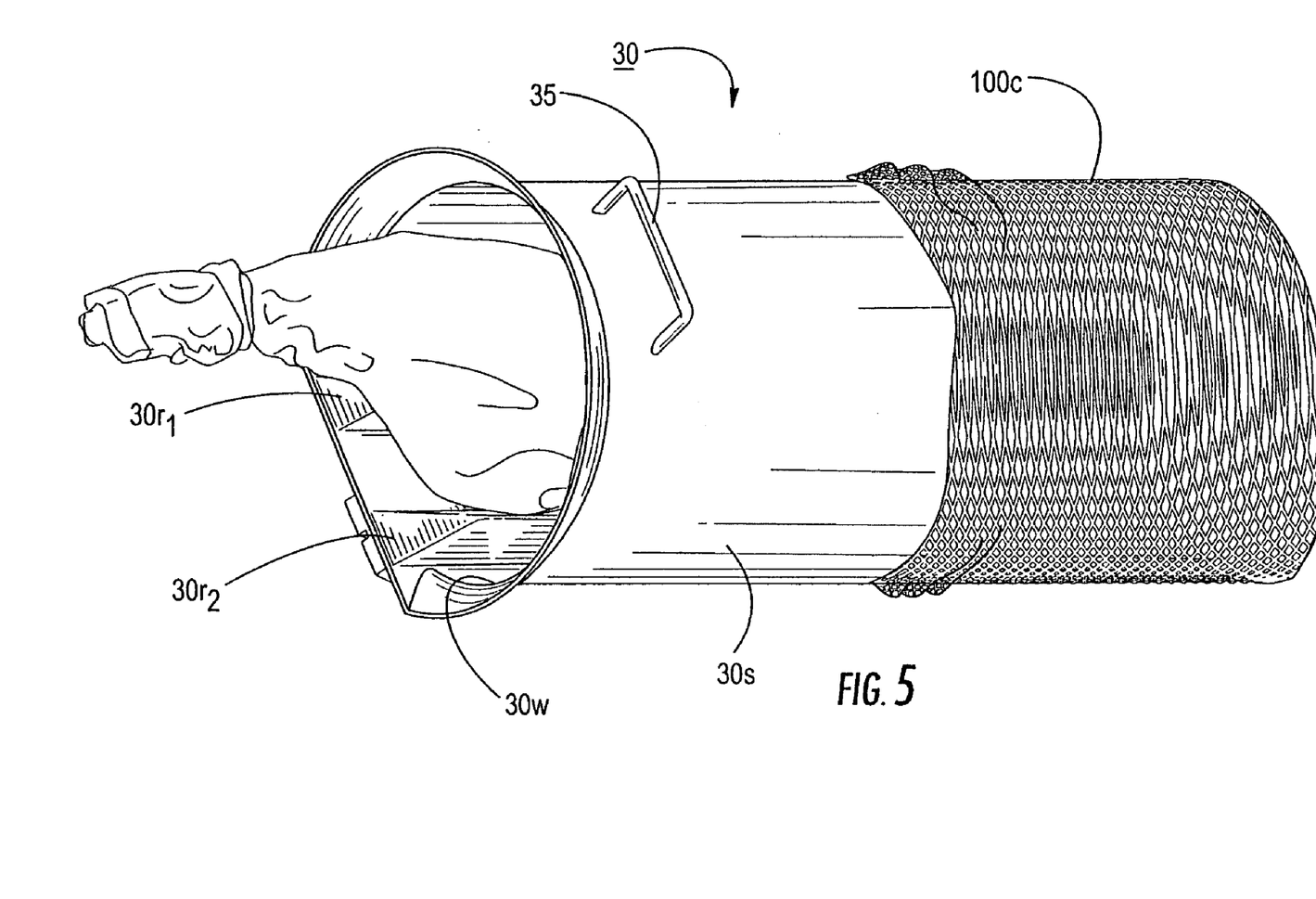
FIG. 5 is a front perspective view of the product chute shown in FIG. 4 illustrating an exemplary object therein in preparation for packaging according to embodiments of the present invention.

FIG. 4 illustrates another embodiment which employs two spaced apart axially extending ribs 30$r_1$, 30$r_2$. The spaced apart ribs define a channel 30ch therebetween. The width of the channel 30ch may correspond to the width of the product, i.e., or a projecting part thereof. As shown in FIG. 5, the ribs 30$r_1$, 30$r_2$ may direct the product to reside primarily in the channel 30ch and, thus, align the product for centered discharge. For the single or dual rib configuration, the rib 30r can extend the entire length of the chute 30 or terminate a distance before the discharge end 30d.

Figure 6:
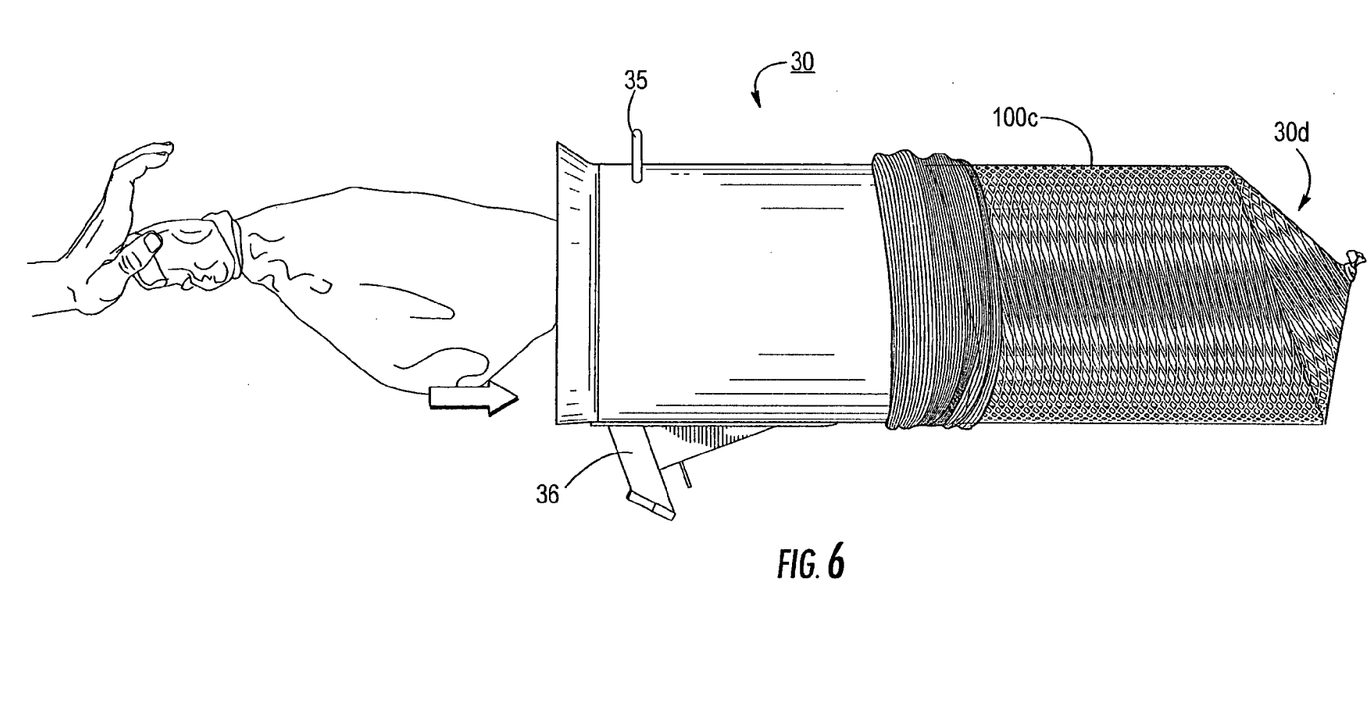
FIG. 6 is a side view of the product chute shown in FIG. 5 with the product chute held substantially horizontally during operation according to embodiments of the present invention.
Figure 7:
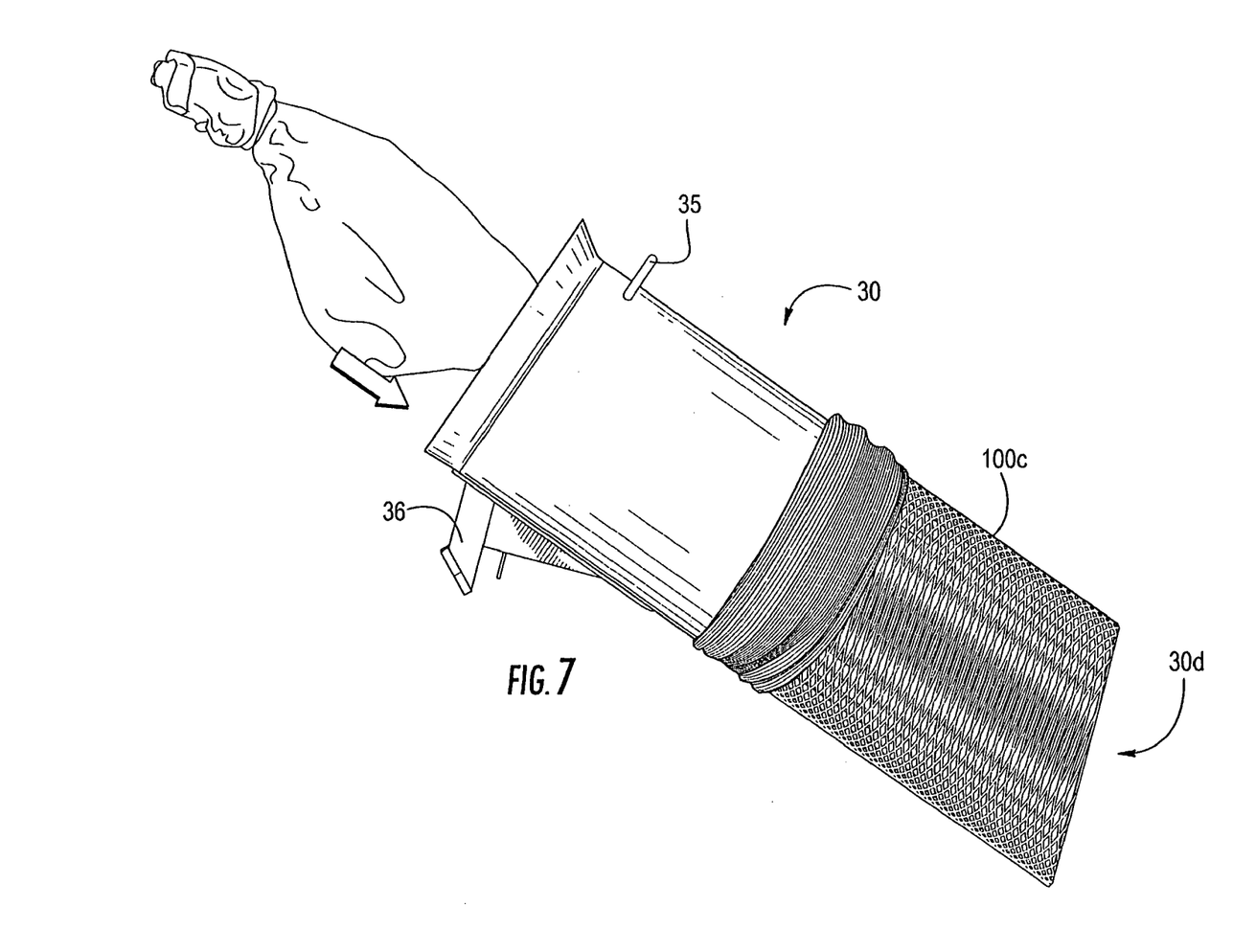
FIG. 7 is a side view of the product chute shown in FIG. 5 with the product chute held tilted relative to horizontal during operation according to other embodiments of the present invention.

FIG. 6 illustrates that the product chute 30 may be held substantially horizontally during operation. FIG. 7 illustrates that the product chute may be held tilted with respect to horizontal during operation. The tilt may be configured so that the chute extends angularly down at between about 30–60 degrees. FIGS. 6 and 7 also illustrate that the discharge end 30d of the product chute may be configured so that a top portion of the chute is shorter than a bottom portion of the chute. As shown, the discharge end of the chute 30d is angled from top to bottom, typically at about 10–45 degrees.

Figure 8:
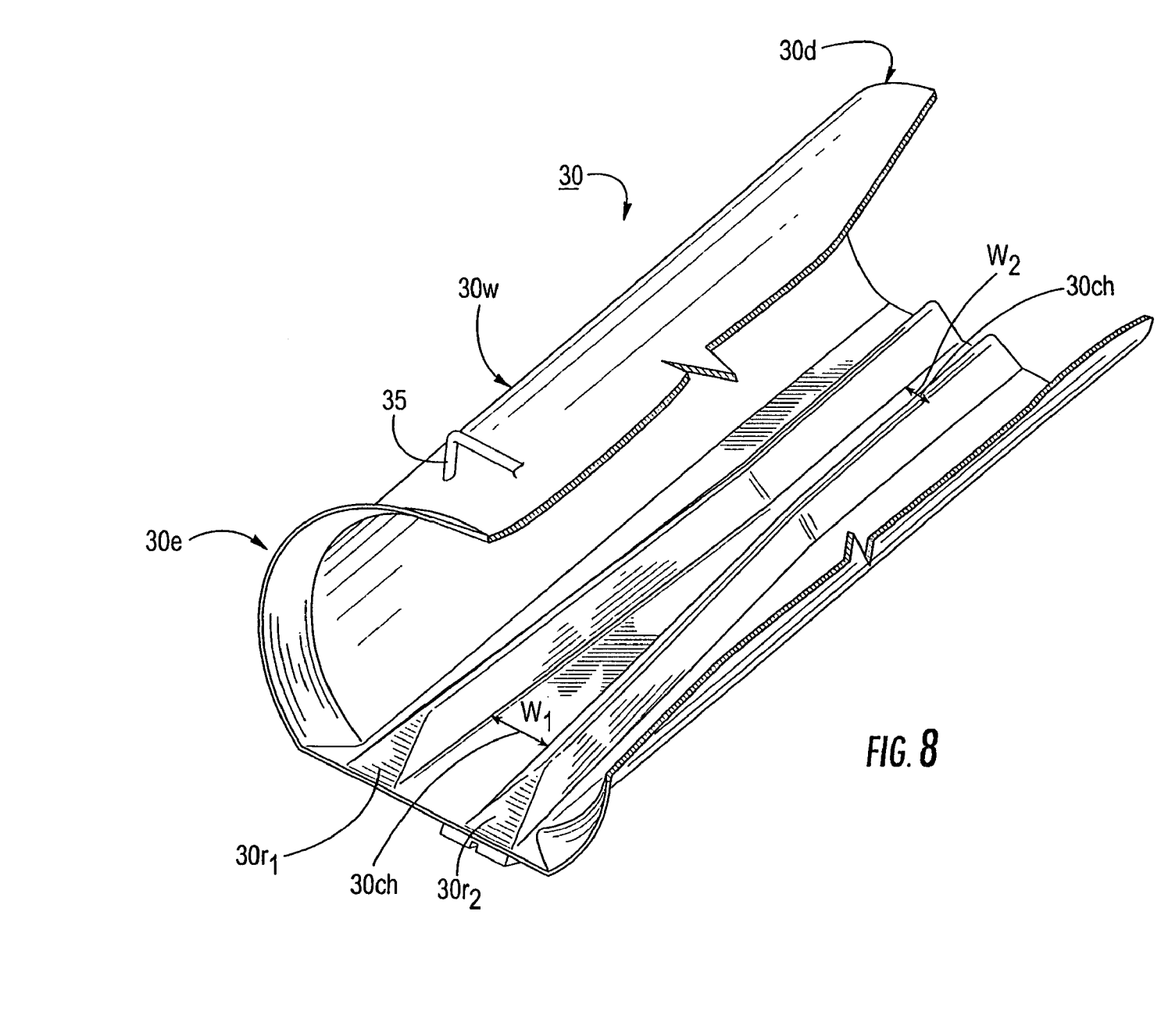
FIG. 8 is a cutaway front perspective view of a product chute according to yet other embodiments of the present invention.

FIG. 8 illustrates that at least one rib 30r, shown as both of the ribs 30$r_1$, 30$r_2$, veer inwardly a distance along a portion of the length of the chute. FIG. 8 illustrates that the two opposing ribs 30$r_1$, 30$r_2$ travel toward each other to narrow the channel 30ch and then remain at a fixed spaced apart distance the remainder of the length of the chute. In other embodiments, the ribs 30$r_1$, 30$r_2$, travel inwardly along substantially the entire length of the chute 30 (not shown). Alternatively, the ribs 30$r_1$, 30$r_2$ may be configured to extend in parallel (substantially straight) through substantially the entire length of the chute cavity.

Figure 9:
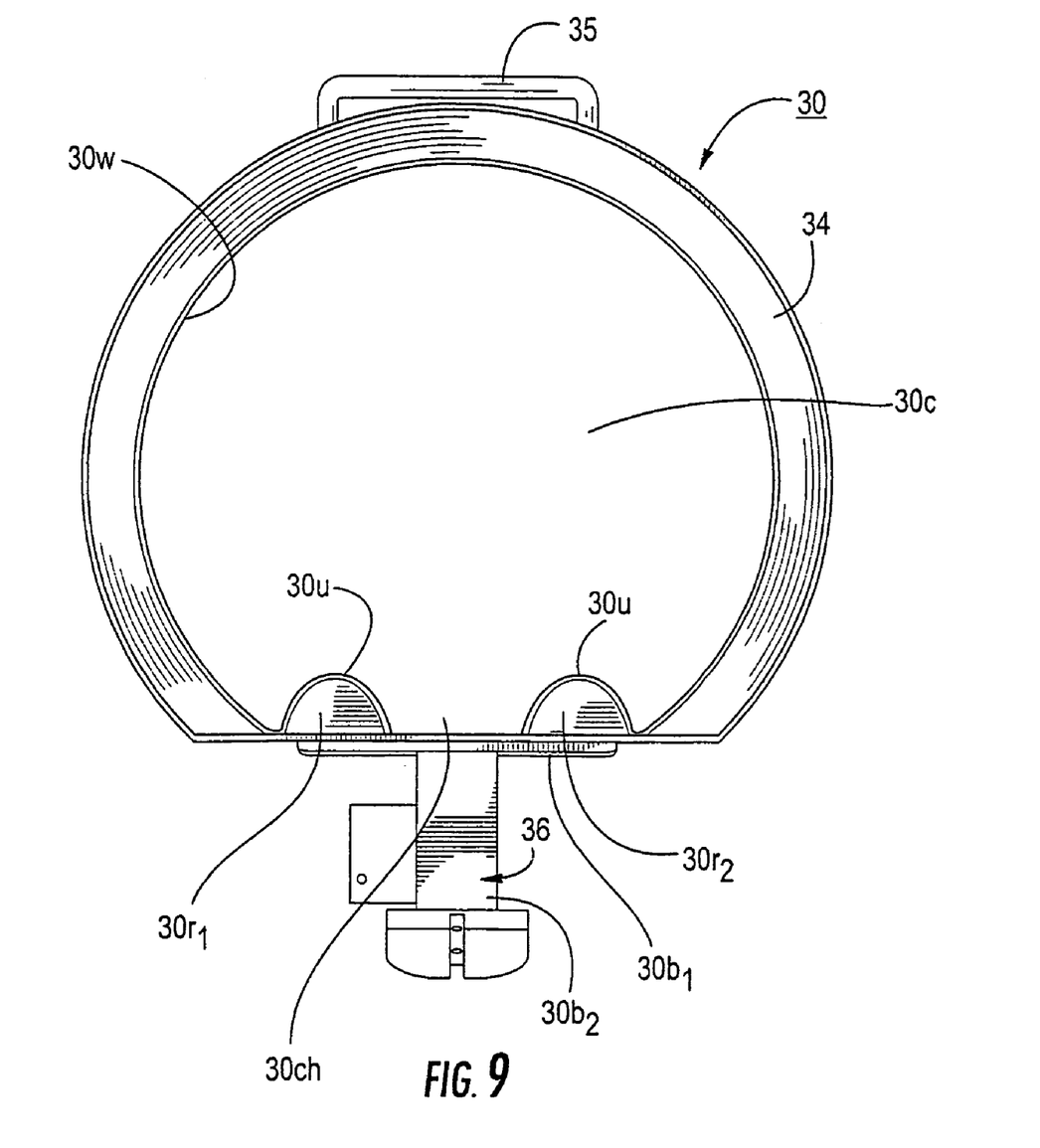
FIG. 9 is a rear end view of a product chute according to additional embodiments of the present invention.

FIG. 9 illustrates an alternate configuration of ribs, each rib 30r having a rounded and/or arcuate upper portion 30u. Embodiments of the present invention contemplate that other rib configurations may also be used.

Although shown with a single object in a netting package, other embodiments of the invention use the product chutes 30 to package groups of objects (not shown).

The product chute floor 30f may be a stationary floor as shown. However, it is also noted that the product chute 30 may include a moving floor. The chute 30 may be sized relative to the product 100 so that the product 100 extends across a major portion of the width of the cavity, and in certain embodiments, extends across at least about 75% of the width of the cavity. In certain embodiments, the product 100 and chute cavity 30c are sized so that the sides and/or top and bottom of the product 100 are pressed against the sidewalls of the chute cavity as the product is pushed therethrough.

The chutes 30 can vary in length depending on the target object or objects and the netting or covering material used, and the like. In particular embodiments, the chutes can have lengths of between about one (1) foot–eight (8) feet long, and more typically between about 2–6 feet long.

Referring to FIG. 9, the product chute 30 can be configured to mount on a mounting bracket 36 that fits into a frame on the apparatus 10, 11. The bracket 36 can include a planar platform 30$b_1$ (typically mounted substantially horizontal) that is connected to an upwardly extending segment 30$b_2$ (typically substantially vertical). The mounting bracket 36 can be configured to relatively easily attach to and be removed from the frame of the apparatus 10, 11 so as to be releasably mountable thereto. The mounting bracket 36 can hold the product chute 30 in alignment with the clipper mechanism 40 downstream and, where used, the product pusher mechanism 20 upstream. In certain embodiments, the system 10, 11 can include a first product chute and a respective first mounting bracket 36 and a second product chute 30 releasably mountable to the apparatus frame 10, 11 at the same position (interchangeable chutes) using a respective second mounting bracket 36 that can be configured substantially the same as the first mounting bracket 36. In other embodiments, the product chute 30 can be lifted off of the mounting bracket 36 (leaving the mounting bracket in place) and another chute 30 placed thereon. The second product chute may be sized and configured the same as the first product chute 30 and loaded with a second supply of covering material. The covering material may be the same as that of the first product chute or different. Thus, the respective first and second mounting brackets 36 can be configured as quick disconnect components (merely loosening and/or releasing attachment hardware) to allow the first and second product chutes 30 to be interchanged on the system 10, 11 in under 5 minutes, and more typically in under about 2 minutes, to allow an operator to employ at least one of a different size product chute, a different configuration product chute, different packaging material dispensed by the product chute.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses, where used, are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A method of packaging whole turkey meat products in netting, comprising:

placing a single turkey in a product chute having opposing ingress and egress end portions and a generally axially open cavity extending therethrough with a floor, the floor having at least one longitudinally extending rib that has a height that is a minor portion of a height of the chute cavity;

pushing the turkey through the product chute so that the turkey contacts the at least one rib and slides through the chute while maintaining contact with and support by the floor;

aligning the turkey to discharge from the chute in a desired orientation in response to contact with the at least one longitudinally extending rib;

clipping at least one of a leading or trailing edge portion of netting encasing the turkey by a clipping mechanism, the netting being pulled externally over a perimeter of the product chute to encase the turkey as the turkey exits the product chute; and wherein the at least one rib is one rib or two or more spaced apart ribs extending along at least a major portion of the length of the chute and wherein the aligning comprises centering the turkey with said at least one rib as it is discharged from the chute so that the turkey is substantially centered relative to the chute and the clipping mechanism, and wherein the turkey is held in a generally conformal bag during the pushing step.

2. A method according to claim 1, wherein the at least one rib is at least two spaced apart longitudinally extending ribs that define a channel therebetween, and wherein the placing step comprises orienting the turkey so that a lower generally medial portion of the turkey resides in the channel.

3. A method according to claim 2, wherein the chute has only the two ribs and the two ribs are substantially parallel and define a channel having sidewalls that rise a minor distance into the cavity of the chute and having a channel width with a floor residing between the ribs that is sized and configured to receive a lower downwardly projecting portion of the turkey, and wherein the turkey slidably travels through the chute cavity contacting the floor of the chute.

* * * * *